(12) United States Patent
Huang

(10) Patent No.: US 11,864,505 B2
(45) Date of Patent: Jan. 9, 2024

(54) SELF-FEEDING WATERING DEVICE

(71) Applicant: Shenzhen Hengxing Visual Technology Co., Ltd., Shenzhen (CN)

(72) Inventor: Lixian Huang, Shenzhen (CN)

(73) Assignee: Shenzhen Hengxing Visual Technology Co., Ltd., Shenzhen (CN)

( * ) Notice: Subject to any disclaimer, the term of this patent is extended or adjusted under 35 U.S.C. 154(b) by 411 days.

(21) Appl. No.: 17/246,847

(22) Filed: May 3, 2021

(65) Prior Publication Data
US 2021/0251159 A1    Aug. 19, 2021

Related U.S. Application Data

(63) Continuation of application No. PCT/CN2019/115407, filed on Nov. 4, 2019.

(30) Foreign Application Priority Data

Nov. 5, 2018 (CN) .......................... 201821812010.5
Mar. 4, 2019 (CN) .......................... 201920266194.8

(51) Int. Cl.
*A01G 25/16*  (2006.01)
*A01G 25/06*  (2006.01)

(52) U.S. Cl.
CPC ........... *A01G 25/167* (2013.01); *A01G 25/06* (2013.01)

(58) Field of Classification Search
CPC ...... A01G 25/06; A01G 25/167; A01G 27/04; A01G 27/06
See application file for complete search history.

(56) References Cited

U.S. PATENT DOCUMENTS

| 5,806,242 A * | 9/1998 | Park ........................ A01G 27/06 47/79 |
| 2008/0035753 A1* | 2/2008 | Sheldrake ............ A01G 27/006 239/50 |
| 2013/0212939 A1* | 8/2013 | Li ........................ A01G 27/005 47/48.5 |
| 2018/0153112 A1* | 6/2018 | Li ........................ A01G 27/003 |

FOREIGN PATENT DOCUMENTS

CN    206442864 U  *  8/2017

* cited by examiner

*Primary Examiner* — Richard G Davis
(74) *Attorney, Agent, or Firm* — Zhigang Ma

(57) ABSTRACT

A self-feeding watering device comprises a water storage unit, a regulating component and a long nozzle cover, and a water guide string extending out of the water storage unit. The regulating component is engaged to the water storage unit. The cover comprises a top cover for connecting with an external container and a long nozzle tube penetrating through the top cover and communicating with the top cover. The long nozzle tube further penetrates through the regulating component and extends towards a bottom of the water storage unit. The string is partially placed at the bottom of the water storage unit, and partially extends out of the water storage unit. The string allow water to penetrate into outside of the unit, and further guiding the water into the soil for automatic irrigation. The device has a compact structural body, can adjust a watering flow rate by a simplified means.

18 Claims, 12 Drawing Sheets

20

20

10a

10a

SELF-FEEDING WATERING DEVICE

TECHNICAL FIELD

The present invention relates to automatic plant irrigation technical field and, in particular to a self-feeding watering device.

BACKGROUND

Green plants planted indoor are helpful to not only beautify the environment, but also brings more fresh air. For automatic watering and irrigation devices of green plants, at present, a variety of products occur on the market. Most of the automatic watering products use drip irrigation means or micro sprinklers, which are not conducive to controlling the soil moisture. On the contrary, this will results in high surface soil moisture and that relatively deeper soil will not be effectively irrigated.

SUMMARY OF THE PRESENT INVENTION

Therefore, a self-feeding watering device is provided, which has a compact structural body, is able to accurately adjust a watering flow rate, and moistens underlying soil completely automatically according to needs of plants.

A self-feeding watering device is provided for water self-feeding, which comprises a water storage unit, a regulating component and a long nozzle cover which are sheathed at an opening of the water storage unit, and a water guide string extending from a side wall of the water storage unit. The regulating component is in threaded connection to the water storage unit. The long nozzle cover comprises a top cover having an opening upward to connect with an external water storage container and a long nozzle tube which penetrates through the top cover and communicates with the top cover. The long nozzle tube further penetrates through the regulating component and extends towards a bottom of the water storage unit. A first part of the water guide string is placed at the bottom of the water storage unit, and a second part of the water guide string extends out of the side wall of the water storage unit. The water guide string is configured for allowing water at the bottom of the water storage unit to penetrate into the outside of the water storage unit, and further guiding the water into the soil along the water guide string for automatic irrigation.

In accordance with another aspect of the present invention, a self-feeding watering device is provided for water self-feeding, which comprises a water storage unit, a regulating component and a long nozzle cover which are sheathed at an opening of the water storage unit, and a water conduit disposed on an outer wall of the water storage unit and communicating with the water storage unit. The regulating component is in threaded connection to the water storage unit. The long nozzle cover comprises a top cover which has an opening upward to connect with an external water storage container and a long nozzle tube which penetrates through the top cover and communicates with the top cover. The long nozzle tube further penetrates through the regulating component and extends towards a bottom of the water storage unit. A water guide string is provided in the water conduit. One end of the water guide string is placed at a bottom of the water conduit, and the other end of the water guide string extends out of the water conduit. The water storage unit allows water to flow into the water conduit, and the water guide string further guide the water into the soil for automatic irrigation.

In actual application of the self-feeding watering device, water in the water storage unit (e.g., from a water storage bottle or a water storage tank) flows into the bottom of the water storage unit through the long nozzle tube, and one end (part) of the water guide string in the water storage component absorbs water and diffuses or penetrates the water into the soil surrounding the other end (part) of the water guide string to make the soil infiltrate, so as to achieve the purpose of irrigating the soil and finally the plant. That is, the water is easily penetrated into more underlying soil by the water guide string. The water guide string is arranged at the bottom end of the long nozzle tube, so that the water at the bottom end of the long nozzle tube is absorbed by the water guide string, so as to control the level drop of the absorbed water in the water storage unit or the water conduit. By rotating the regulating component, the long nozzle cover in the regulating component is brought to move up and down at the same time, so as to adjust a length of the long nozzle tube extending into the water storage unit, to control the water level height in the water storage unit, and further control the amount of water absorbed by the water guide string, thereby adjusting the flow rate of irrigation water. The self-feeding watering device has a small size, can accurately adjust the flow rate of the effluent, and the adjustment operation is simplified. the present invention has a simplified and compact installation structure, easy production, low cost and easy popularization.

DETAILED DESCRIPTION OF THE PRESENT INVENTION

The foregoing and other exemplary purposes, aspects and advantages of the present invention will be better understood in principle from the following detailed description of one or more exemplary embodiments of the present invention with reference to the embodiment(s) and accompanied drawings. It is understood to one skilled in the art that the following description with reference to the embodiment(s) and accompanied drawings is merely to explain concepts and principals of the present invention but should not be seemed as limitation to the scope of the present invention.

Figure 1:
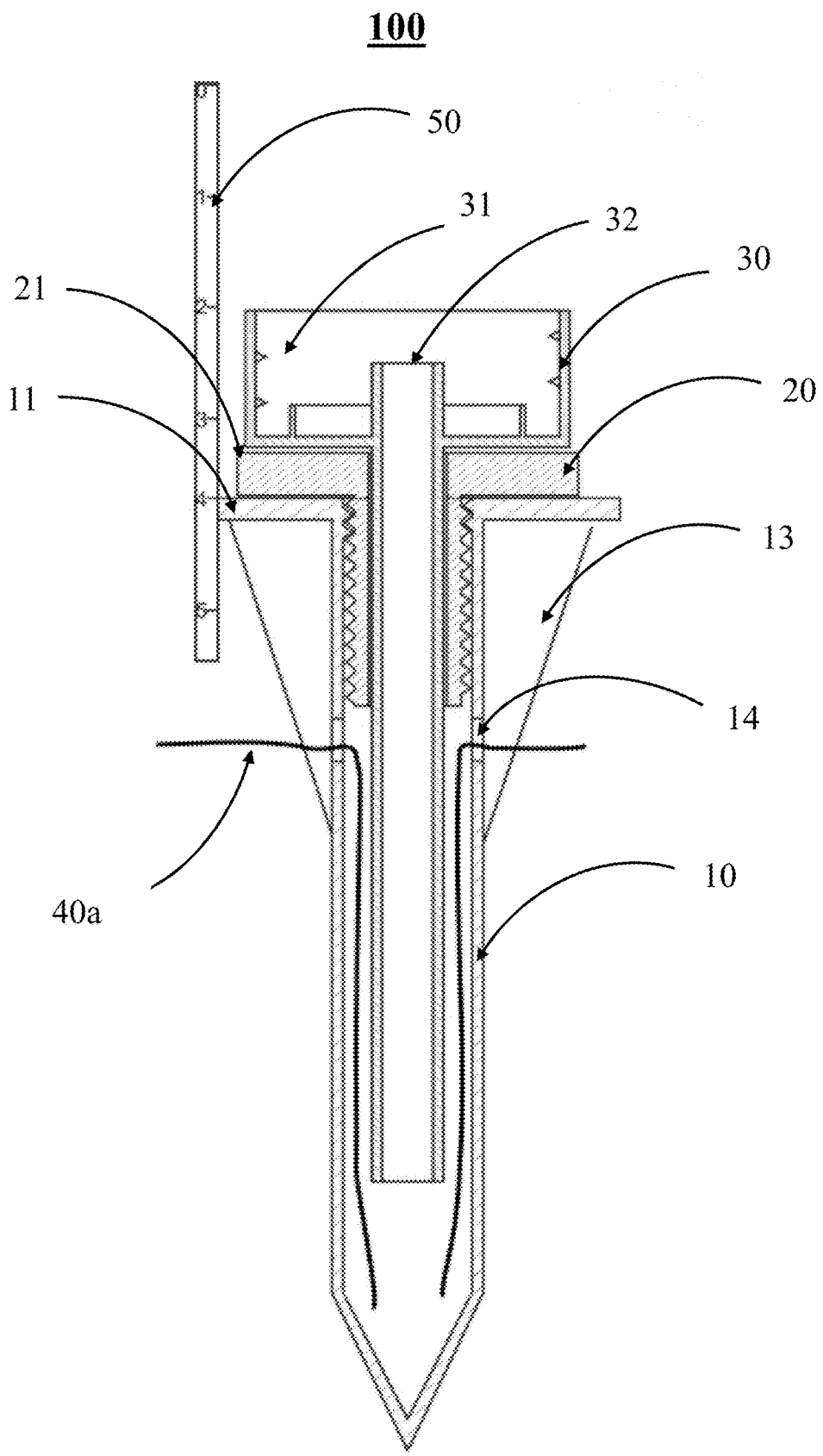
FIG. 1 is a schematic sectional view of a self-feeding watering device according to a first embodiment of the present invention.

Please referring to FIG. 1, in accordance with an embodiment of the present invention, a self-feeding watering device is provided for water self-feeding, which comprises a water storage unit 10, a regulating component 20 and a long nozzle cover 30 which are sheathed at an opening of the water storage unit 10, and a water guide string 40 extending from a side wall of the water storage unit 10. The regulating component 20 is in threaded connection to the water storage unit 10. The long nozzle cover 30 comprises a top cover 31 which has an opening upward to connect with an external water storage container, and a long nozzle tube 32 which penetrates through the top cover 31 and communicates with the top cover 31. The long nozzle tube 32 further penetrates through the regulating component 20 and extends towards a bottom of the water storage unit 10. A first part of the water guide string 40 is placed at the bottom of the water storage unit 10, and a second part of the water guide string 40 extends out of the side wall of the water storage unit 10. The first part of the water guide string 40 is opposite to the second part of the water guide string 40, e.g, the first and second parts is two opposing ends of the water guide string 40. The water guide string 40 is configured for allowing water at the bottom of the water storage unit 10 to penetrate into the outside of the water storage unit 10, and further guiding the water into the soil along the water guide string 40 for automatic irrigation. Thus, the water guide string 40 allow the water to penetrate and permeate along the string until the soil by itself. For utilizing function of penetration and permeation of the water itself, additional power supply for pumping or driving the water is free from the device. Preferably, the water guide string 40 is made of one of a cotton material and a material containing cotton. Thus, a water diversion capacity of the water guide string 40 is preferably predetermined for demand by any means of modifying the string material thereof (varying percent of the cotton in the string material), diameter of the string, length of the string, and so on.

Figure 2:
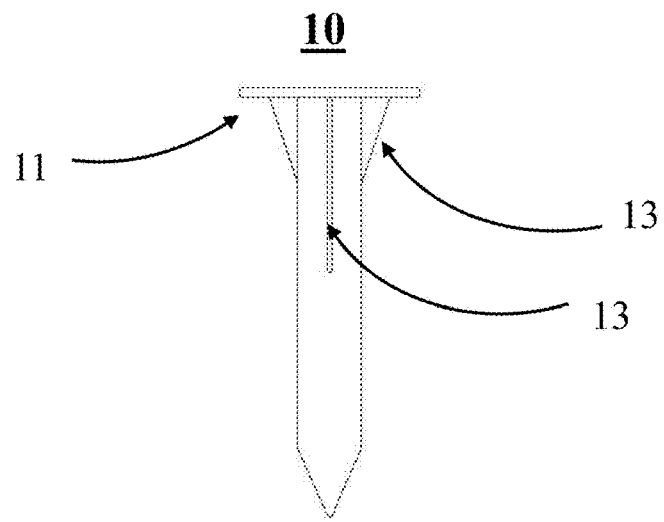
FIG. 2 is a schematic and structural view of a water storage unit of the self-feeding watering device according to the first embodiment of the present invention.
Figure 3:
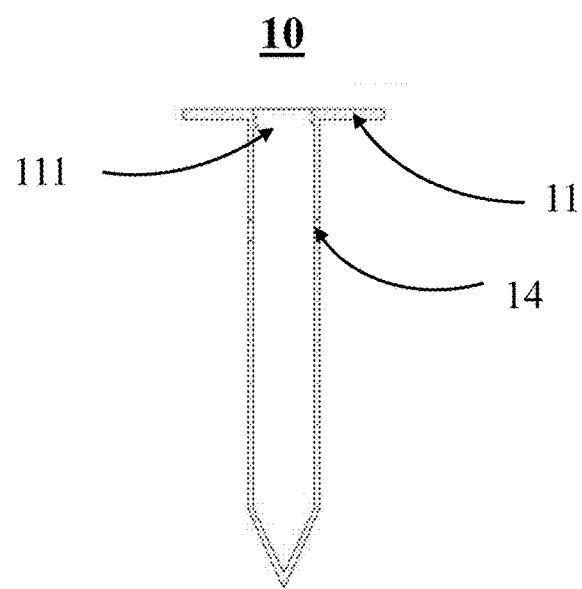
FIG. 3 is a schematic sectional view of the water storage unit of the self-feeding watering device according to the first embodiment of the present invention.
Figure 4:
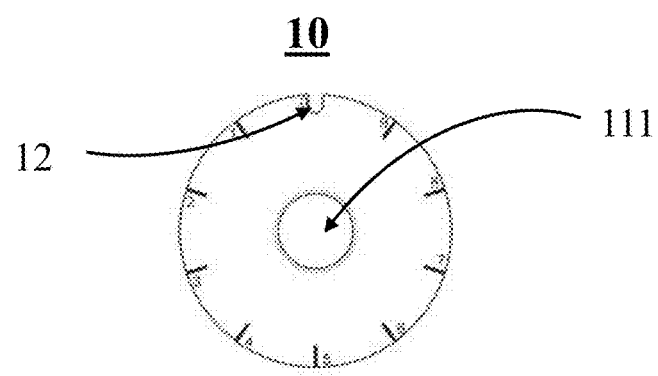
FIG. 4 is a top view of the water storage unit of the self-feeding watering device according to the first embodiment of the present invention.

Referring to FIG. 2, FIG. 3 and FIG. 4, the water storage unit 10 is shown. Preferably, the water storage unit 10 is mainly a hollow cylinder, the bottom of the water storage unit 10 is in a shape of a cone. A top of the water storage unit 10 is provided with a first flange 11 extending outward. A center of the first flange 11 is provided with a threaded through hole 111, and an outside of the first flange 11 is provided with at least one first groove 12. The first groove 12 is configured for disposing the water level gauge 50. A plurality of wing plates 13 are interposed between a bottom surface of the first flange 11 and a side wall of the water storage unit 10. The wing plates 13 are in right triangle or arc shape. When the wing plates 13 are right triangle plates each with two right angle edges respectively adjacent to the bottom surface of the first flange 11 and the side wall of the water storage unit 10. The hypotenuse of each right triangle plate extends to an outer edge of the first flange 11 and the side wall of the water storage unit 10 at two ends. The top surface of the first flange 11 is provided with ten equal scales for indicating the water level height. The side wall of the water storage unit 10 is provided with at least one through hole 14. The water guide string 40 is preferably penetrated outward from the through hole 14. One end of the water guide string 40 is arranged in the water storage unit 10, the other end of the water guide string 40 extends out of the water storage unit 10, and position of the through hole 14 of the water storage unit 10 is lower than a bottom end of the regulating component 20.

Figure 5:
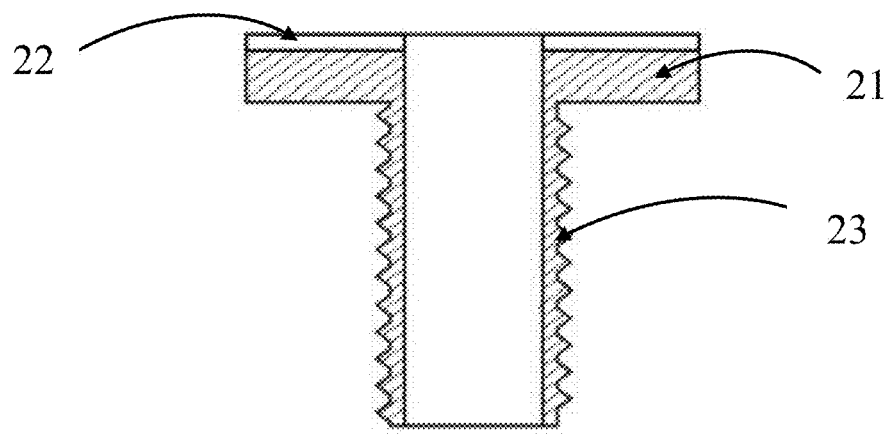
FIG. 5 is a sectional view of a regulating component of the self-feeding watering device according to the first embodiment of the present invention.
Figure 6:
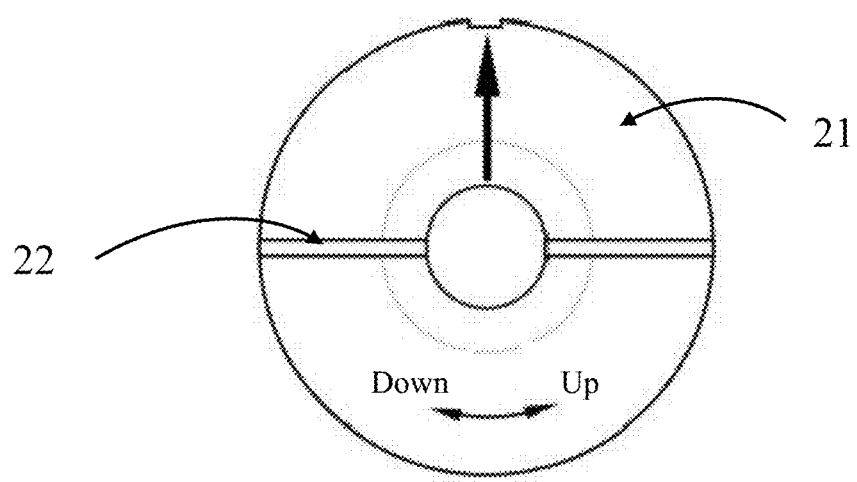
FIG. 6 is a top view of the regulating component of the self-feeding watering device according to the first embodiment of the present invention.

Referring to FIG. 5 and FIG. 6, the regulating component 20 is shown. Preferably, the regulating component 20 is a hollow stud. A top of the regulating component 20 is provided with a second flange 21 extending outward. A stud body of the regulating component 20 has an external thread. The regulating component 20 is in threaded connection to the threaded through hole 111 of the water storage unit 10. Thus, the regulating component 20 can be lifted and lowered by rotation to adjust water surface level in the water storage unit 10, thereby controlling penetration speed of water.

Figure 7:
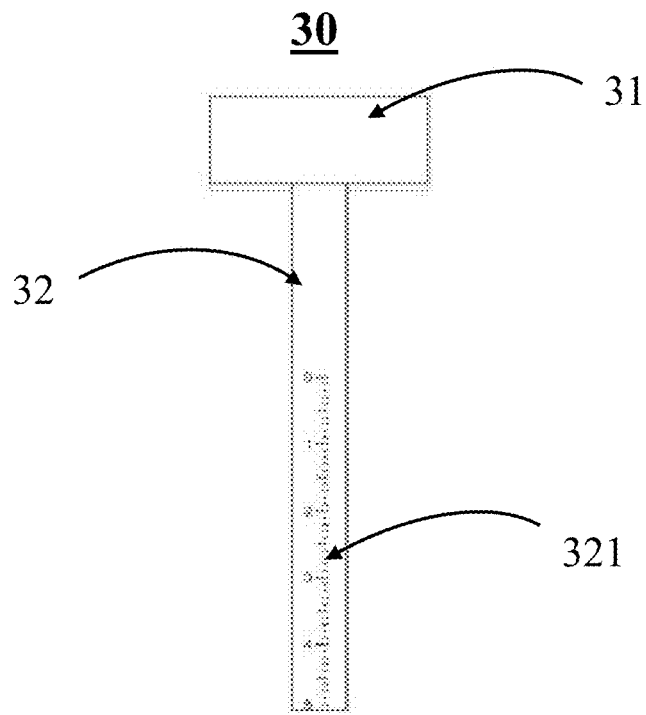
FIG. 7 is a schematic and structural view of a long nozzle cover of the self-feeding watering device according to the first embodiment of the present invention.
Figure 8:
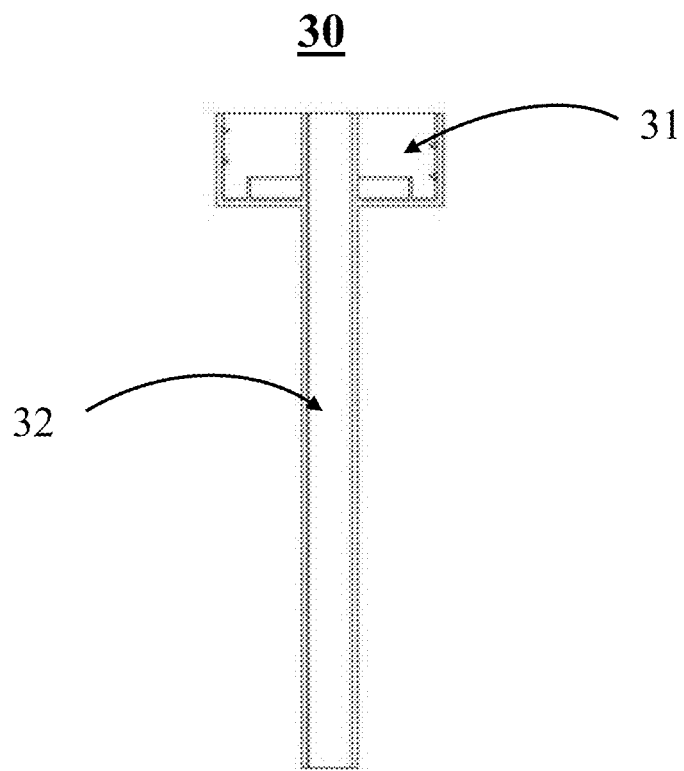
FIG. 8 is a sectional view of the long nozzle cover of the self-feeding watering device according to the first embodiment of the present invention.
Figure 9:
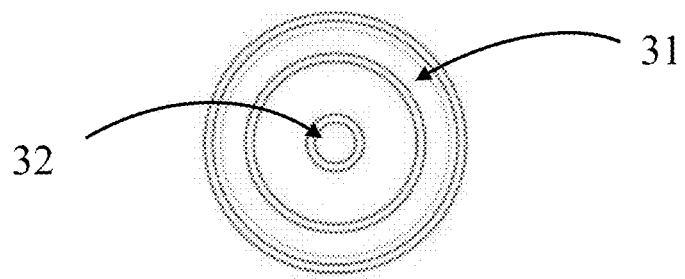
FIG. 9 is a top view of the long nozzle cover of the self-feeding watering device according to the first embodiment of the present invention.

Referring to FIG. 7, FIG. 8 and FIG. 9, the long nozzle cover 30 is shown. Preferably, the top cover 31 and the long nozzle tube 32 of the long nozzle cover 30 are integrated as a whole. The top cover 31 is in the shape of a bottle cap with an opening upward, a bottom of the top cover 31 is provided with a protrusion bar protruding downward, and an inner wall of the top cover 31 is provided with an internal thread for threaded connection with an external water storage container. The top end of the long nozzle tube 32 protrudes from the bottom of the top cover 31. A top face of the second flange 21 of the regulating component 20 is provided with at least one second groove 22, and the protrusion bar at the bottom of the top cover 31 is inserted in the second groove 22. The top face of the second flange 21 is also provided with an indication mark for indicating the rotation direction and a direction mark for indicating the rotation angle. The long nozzle tube 32 is provided with a scale 321 corresponding to the water level gauge 50 for facilitating to read the water level height. The long nozzle tube 32 is intercepted to a per-determined length as required. The bottom of the top cover 31 is provided with an upward convex ring which is spaced relative to an outer periphery of the top end of the long nozzle tube 32. The height of the convex edge is lower than the top end of the long nozzle tube 32.

Specifically, the protrusion bar at the bottom of the top cover 31 is inserted into the second groove 22. When the top cover 31 is rotated, the regulating component 20 rotates synchronously, and the regulating component 20 can be conveniently controlled by rotating an external water storage container, for example, a water bottle. In an alternative embodiment, a thin stick or steel wire will also be inserted into the second groove 22 to rotate the regulating component 20.

In particular, the regulating component 20 is engaged to the threaded through hole 111 of the water storage unit 10, and a nozzle height of the long nozzle tube 32 is adjusted by rotating the regulating component 20 to control the water seepage speed accurately.

Specifically, the water level gauge 50 is inserted into the first groove 12, the side wall of the long nozzle tube 32 is provided with the scale 321, and the scale values of the water level gauge 50 corresponds to the scale values of the scale 321. When the regulating component 20 is rotated, the long nozzle cover 30 moves synchronously, and thus the water level height can be read through each of the water level gauge 50 and the scale 321. The circumference of the first flange 11 adopts a ten degree dividing disk (e.g., turntable). The angle mark on the top face of the regulating component 20 points to the corresponding number of the dividing disk when the regulating component 20 is rotated, so that the water level scale can be read more accurately.

Further, in actual application, the top cover 31 is rotatably equipped with a water storage bottle, or the top end of the long nozzle tube 32 is connected to a water storage tank through a hose. The water storage bottle and the top end of the water storage tank are provided with a water filling port. The water storage bottle and the water storage tank is acted as a water source.

Specifically, the nozzle of the long nozzle tube 32 is relatively longer and extends into the water storage bottle in a predetermined enough length to allow the impurities in the water storage bottle to fall into a gap between the long nozzle tube 32 and the convex ring. The longer nozzle of the long nozzle tube 32 can be conveniently connected with the hose associated with the water storage tank.

In particular, an end point, e.g., at the first part or the first end, of the water guide string 40 in the water storage unit 10 is arranged approximately at a bottom mouth of the long nozzle tube 32. The water guide string 40 absorbs the water from the bottom mouth of the long nozzle tube 32. The air enters the water storage bottle or tank from the opening of the long nozzle tube 32, and air pressure in the water storage bottle or tank increases, so that the water flows out from the long nozzle tube 32. By turning the regulating component 20 for example in a clockwise direction, the bottom mouth of the long nozzle tube 32 is turned to be lower than the end point of the water guide string 40. In this situation, the height level of water flowing out is higher than the bottom mouth of the long nozzle tube 32, the air cannot enter the long nozzle tube 32 and the water storage bottle or tank, and the water in the water storage bottle or tank cannot flow out. By turning the regulating component 20 for example in a counter clockwise direction, the bottom mouth of the long nozzle tube 32 is higher than the end point of the water guide string 40, the outflow water is absorbed by the water guide string 40, the water level in the water storage unit 10 drops, and the air enters the water storage bottle or tank through the long nozzle tube 32, so that the water in the water storage bottle or tank flows out into the water storage unit 10.

In another embodiment of the present invention, one or more gaskets are sheathed on the top of the long nozzle tube 32 of the long nozzle cover 30 and interposed between the long nozzle cover 30 and the second flange 21 to achieve the purpose of adjusting the water level. In this embodiment, many ways will be used to adjust the water level, such as by setting one or more gaskets, by adjusting the thread of the regulating component 20, or by any combination of setting one or more gaskets and adjusting the thread of the regulating component 20. The other components are the same as the embodiment mentioned above and will not be described in detail again.

Figure 10:
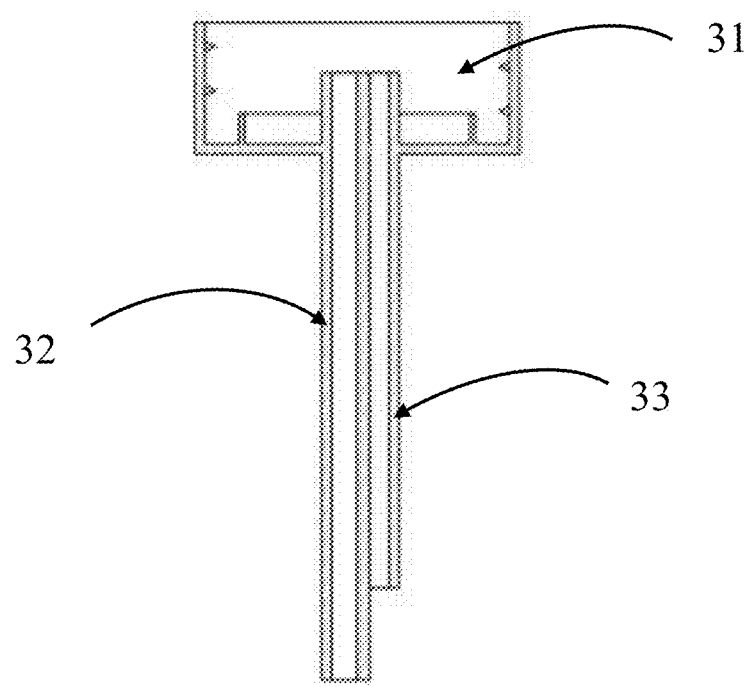
FIG. 10 is a sectional view of the long nozzle cover with an air inlet pipe of the self-feeding watering device according to the first embodiment of the present invention.
Figure 11:
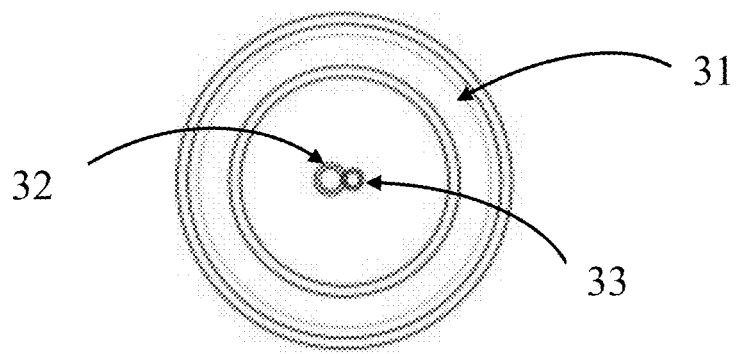
FIG. 11 is a top view of the long nozzle cover with an air inlet pipe of the self-feeding watering device according to the first embodiment of the present invention.

Referring to FIG. 10 and FIG. 11, in accordance with another embodiment, the long nozzle cover 30 with an air inlet tube 33 is shown. The long nozzle cover 30 has two long tubes, two of which are arranged in parallel, one of which is the long nozzle tube 32, which is used to allow the water in the water storage bottle or the water storage tank to flow out to the water storage unit 10, and the other long tube is the air inlet tube 33. For the air return of the water storage bottle or tank, a length of the air inlet tube 33 is shorter than that of the long nozzle tube 32. That is, position of the bottom mouth of the air inlet tube 33 is higher than that of the long nozzle tube 32, so that the bottom mouth of the air inlet tube 33 is always above the water level in the water storage unit 10, ensuring the airflow smoothness of the air inlet tube 33 and that the water in the water storage bottle or tank flows out more smoothly. The other components are the same as the embodiment mentioned above and will not be described in detail again.

Figure 12:
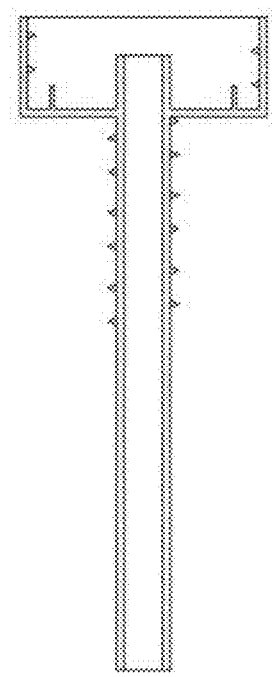
FIG. 12 is a structural sectional view of an integration of the regulating component and the long nozzle cover of the self-feeding watering device in another embodiment of the present invention.

In still another embodiment, an integrated structure of the regulating component and the long nozzle cover is shown in FIG. 12. Preferably, the regulating component and the long nozzle cover are integrated as a whole, the outer side of the long nozzle tube is provided with an external thread, and the long nozzle tube is rotationally installed in the top opening of the water storage unit. The other components are the same as the embodiment mentioned above and will not be described in detail again.

Figure 13:
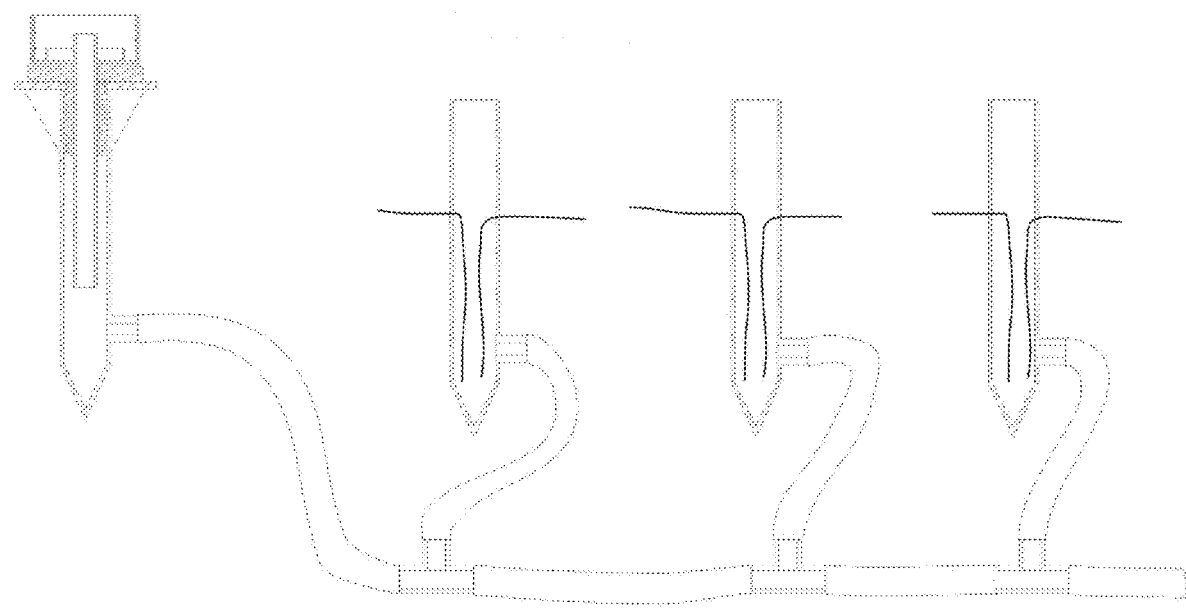
FIG. 13 is a schematic and structural view of a solution of multiple water outlet ports of the self-feeding watering device in another embodiment of the present invention.
Figure 14:
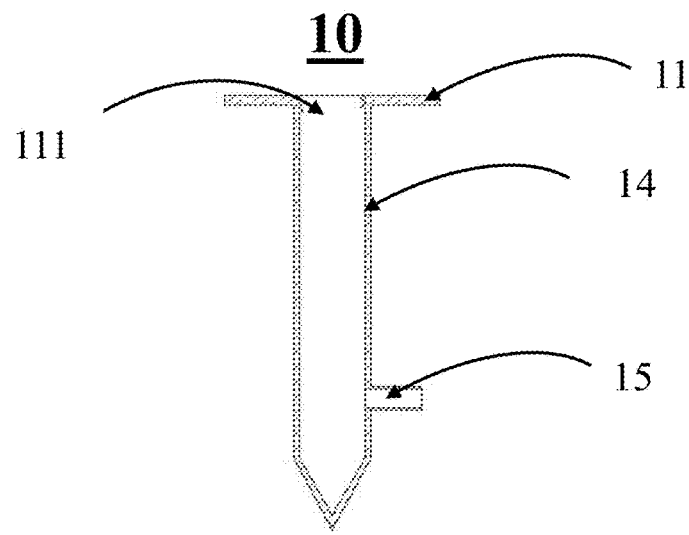
FIG. 14 is a schematic view of the water storage unit in FIG. 13.

In yet another embodiment, a plurality of water outlet ports are adopted. FIG. 13 and FIG. 14 show a scheme of the multiple water outlet scheme. Preferably, a water outlet 15 is defined at a bottom end of the water storage unit 10, as a main water storage unit. A second water storage unit is connected to the main water storage unit 10 through a hose.

The bottom of the second water storage unit is provided with another water inlet, and a side wall of the second water storage unit is provided with the through holes. Each of the through holes is penetrated with the water guide string. Other structure and features of the second water storage units are the same to those of the water storage unit 10 in these embodiments mentioned above.

It is to be understood that more second water storage units are used to be connected to the main water storage unit 10 in the same means as described above, for watering a plurality of green plants at the same time. Preferably, the plurality of green plants are located at the same height, or the plurality of the second water storage units are placed at the same height.

Figure 15:
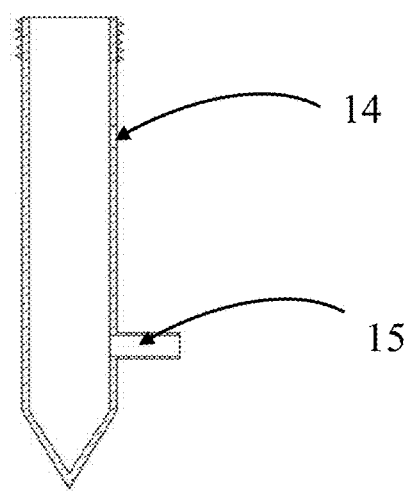
FIG. 15 is a schematic sectional view of a water storage unit with an external thread of a self-feeding watering device in another embodiment of the present invention.
Figure 16:
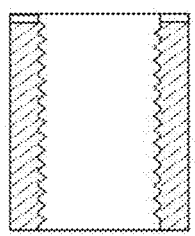
FIG. 16 is a schematic sectional view of a regulating component with an internal thread of a self-feeding watering device in another embodiment of the present invention.

Referring to FIG. 15 and FIG. 16, another water storage unit 10' and the regulating component 20' in another embodiment are shown. In this embodiment, a top of the water storage unit 10' has an external thread, the regulating component 20' has an internal thread. The regulating component 20' is rotationally engaged to an outside wall of the water storage unit 10'. The top end of the water storage unit 10' and the regulating component 20' is not provided with the first flange and the second flange (as are used in embodiment above) extending outwards, and the water storage unit 10' has a small volume, for watering small flowerpots. The other components are the same as these embodiments mentioned above and will not be described in detail.

Figure 17:
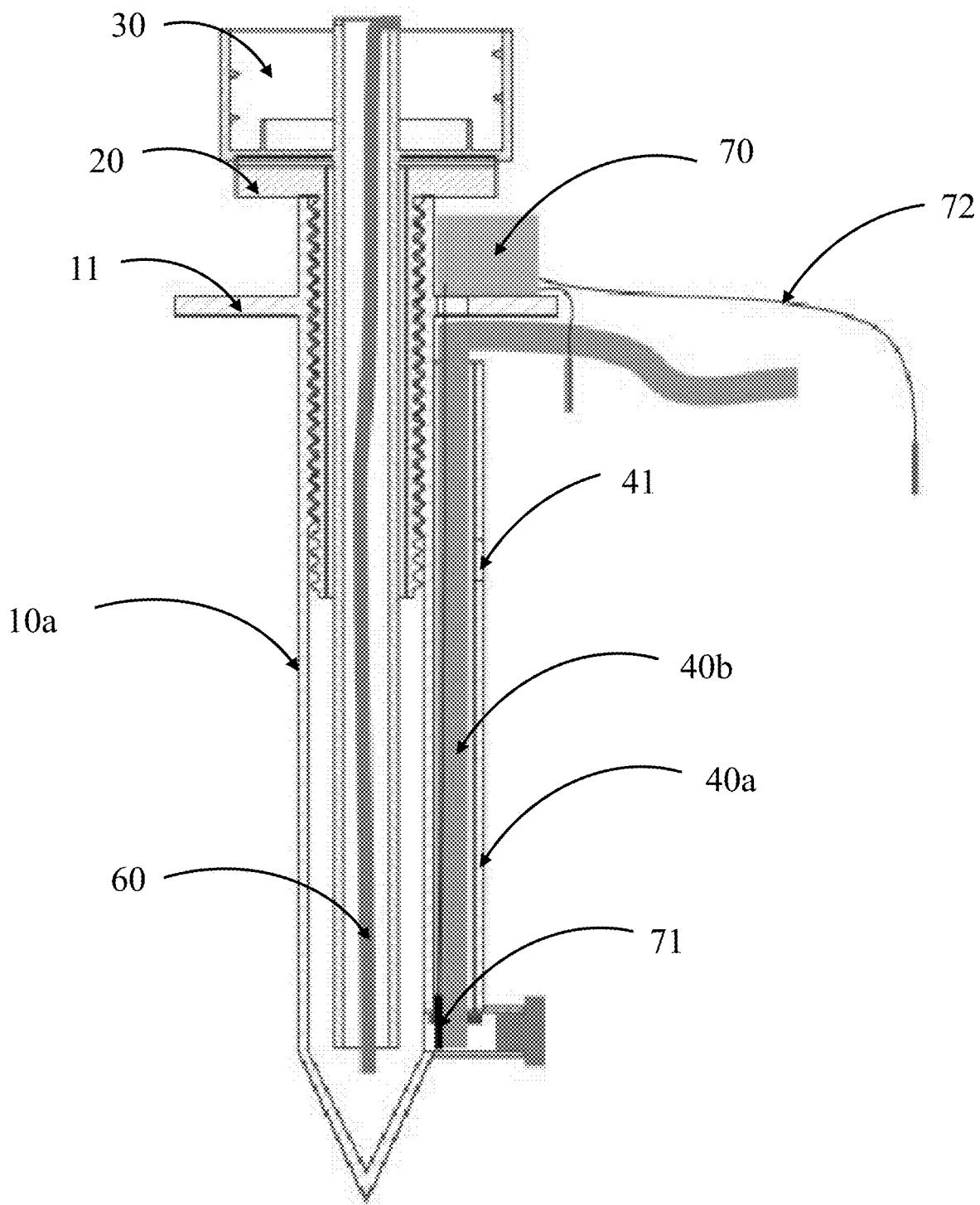
FIG. 17 is a schematic sectional view of another self-feeding watering device according to a second embodiment of the present invention.

Referring to FIG. 17, in accordance with still another embodiment of the present invention, still another self-feeding watering device 200 for automatic watering is shown, which comprises a water storage unit 10a, a regulating component 20 and a long nozzle cover 30 sheathed at an opening of the water storage unit 10a, and a water conduit 40a disposed on an outer wall of the water storage unit 10a and connected with the water storage unit 10a. The regulating component 20 is threaded to the water storage unit 10a. The long nozzle cover 30 comprises a top cover 31 with upward opening for connecting with the external water storage container, and a long nozzle tube 32 which passes through the top cover 31 and communicates with the top cover 31. The long nozzle tube 32 passes through the regulating component 20 and extends into a bottom of the water storage unit 10a. The water guide string 40b is arranged in the water conduit 40a. One end of the water guide string 40b is placed at a bottom of the water conduit 40a, and the other end extends outward from the water conduit 40a. The water in the water storage unit 10a flows into the water conduit 40a, and the water is guided into the soil through the water guide string 40b for automatic irrigation.

Further, a third through hole 41 is defined on a side wall of the water conduit 40a. One end of the water guide string 40b is placed at the bottom of the water conduit 40a, and the other end of the water guide string 40b extends outward from a top opening of the water conduit 40a or the third through hole 41. When the water guide string 40b extends outward from the third through hole 41, water diversion speed of the water guide string 40b can be accelerated.

Thus, the water guide string 40b extends outward through the top opening of the water conduit 40a, or optionally penetrates through the third through hole 41. Length of the water guide string 40b extending into the water conduit 40a in relation to the two means is different, so that the water diversion amount of the water guide string 40b is different, so as to expand the adjustment range of the water outlet speed of the self-feeding watering device 200.

Figure 18:
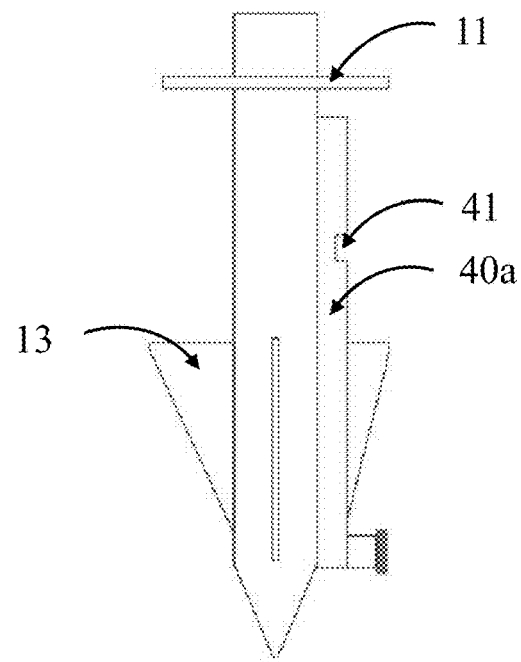
FIG. 18 is a schematic and structural view of a water storage unit of the self-feeding watering device according to the second embodiment of the present invention.
Figure 19:
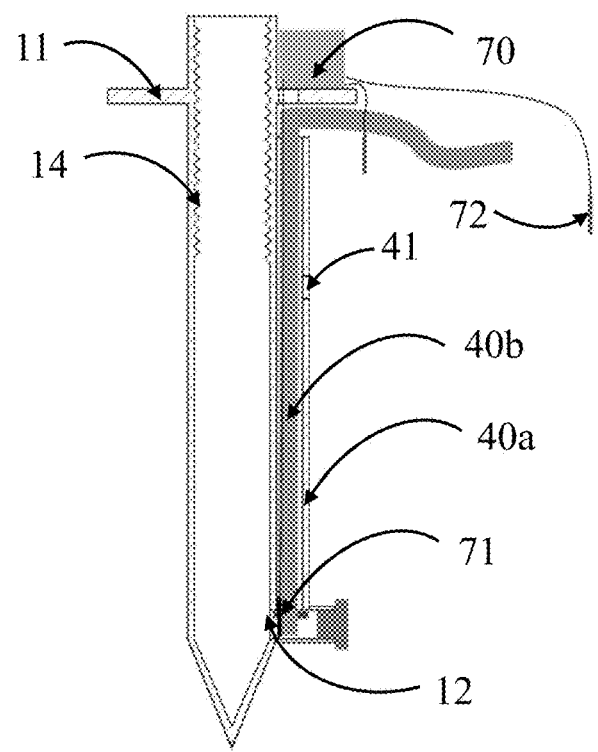
FIG. 19 is a schematic sectional view of the water storage unit of the self-feeding watering device according to the second embodiment of the present invention.
Figure 20:
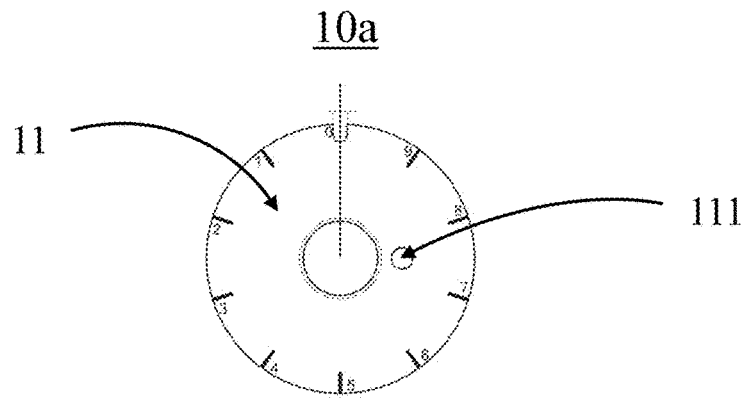
FIG. 20 is a top view of the water storage unit of the self-feeding watering device according to the second embodiment of the present invention.

Refer to FIG. 18, FIG. 19 and FIG. 20, illustrating the water storage unit 10a. In particular, the water storage unit 10a is mainly a hollow cylinder. An inner wall of the water storage unit 10a has a first internal thread 14, a bottom of the water storage unit 10a is preferably in a shape of a cone. An outer wall of the water storage unit 10a has a plurality of wing plates 13. The structure of the wing plates 13 is basically the same as that of the first embodiment, and the difference lies in the position. The wing plates 13 in this embodiment extend from a bottom part of the water storage unit 10a. The wing plates 13 are configured to prevent the water storage unit 10a from rotating in the soil, so as to stably insert and support in the soil. A first flange 11 extending outward is disposed near a top of the water storage unit 10a. The first flange 11 is the same as the first flange 11 in the first embodiment, so it will not be repeated to be described here.

Specifically, the wing plates 13 is arranged on the outer wall of the cylindrical part of the water storage unit 10a. The wing plates 13 are beneficially in a right triangle shape. One right angle edge of the right triangle is attached to the outer wall, and the hypotenuse of the right triangle is outward. In an alternative embodiment, the wing plates 13 are arc-shaped, each of the wing plates 13 is a protruding rib, and an outer bottom end of the wing plates 13 each are connected with the outer wall at an acute angle. The water storage unit 10a is integrated as a whole with the wing plates 13. When the regulating component 20 is rotated to adjust the water diversion speed of the water guide string 40B, the wing plates 13 is configured to prevent the water storage unit 10a from rotating in the soil, so as to stably insert and support in the soil. At the same time, the wing plates 13 also play a benefit role in strengthening the strength of the water storage unit 10a. When the water storage unit 10a is inserted into the soil, it is enough strong not to bend.

Furthermore, the water conduit 40a and the water storage unit 10a are integrally formed, the water conduit 40a is arranged on the outer wall of the water storage unit 10a and is parallel to the water storage unit 10a. Preferably, the water storage unit 10a and the water conduit 40a use a common side wall, a bottom end of the water conduit 40a is arranged at the about bottom end of the water storage unit 10a. The common side wall is provided with a first through hole 12 which is arranged at the bottom end of the water conduit 40a and communicates the water conduit 40a and the water storage unit 10a. A top opening of the water conduit 40a is positioned below the first flange 11, and the position of the first flange 11 corresponding to the top opening of the water conduit 40a is provided with a second through hole 111 which is used for penetrating the water quantity sensor 71. Preferably, the water conduit 40a is disposed below the second through hole 111.

The structure of the regulating component 20 is the same as that of the regulating component 20 in the first embodiment, so it will not be repeated here.

Figure 21:
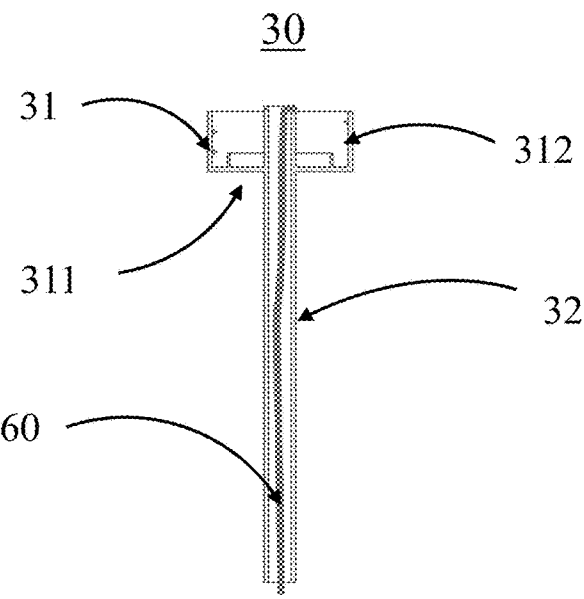
FIG. 21 is a schematic sectional view of a regulating component of the self-feeding watering device according to the second embodiment of the present invention.
Figure 22:
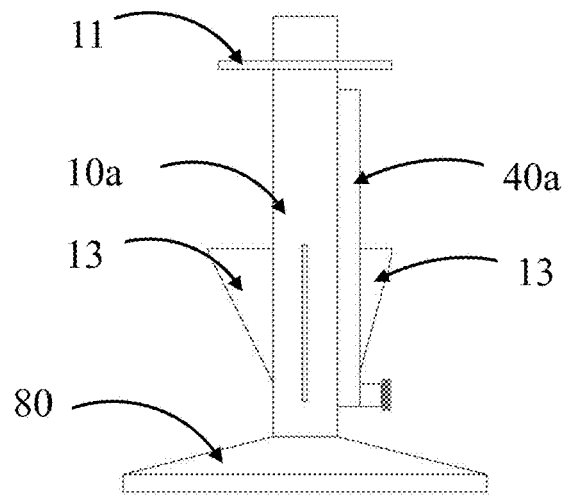
FIG. 22 is a schematic view of a water storage unit with an integral base of a self-feeding watering device according to still another embodiment of the present invention.
Figure 23:
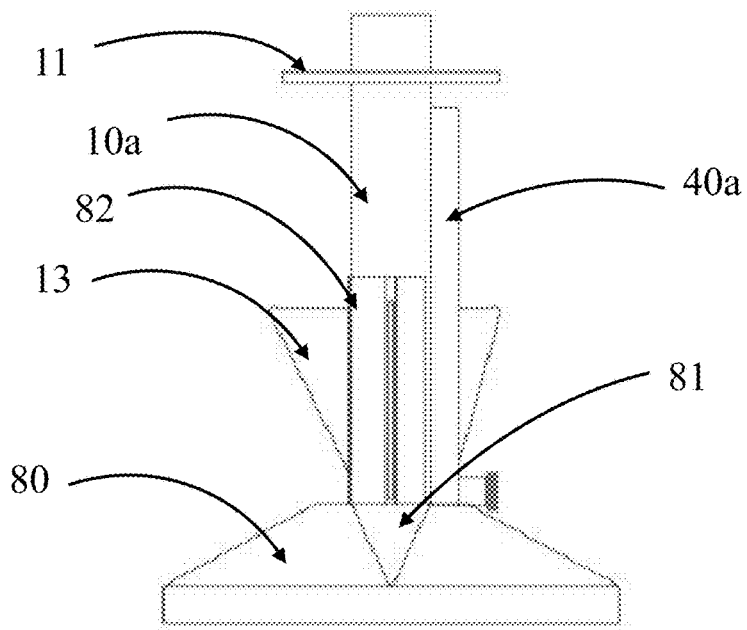
FIG. 23 is a schematic view of the water storage unit with a separated base of the self-feeding watering device according to still another embodiment of the present invention.
Figure 24:
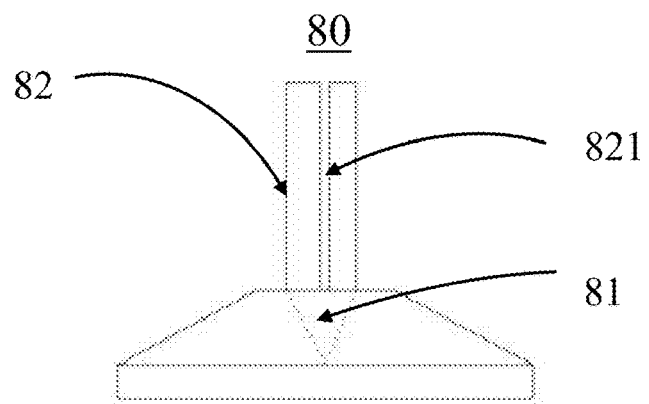
FIG. 24 is a schematic view of the separated base of the self-feeding watering device according to still another embodiment of the present invention.
Figure 25:
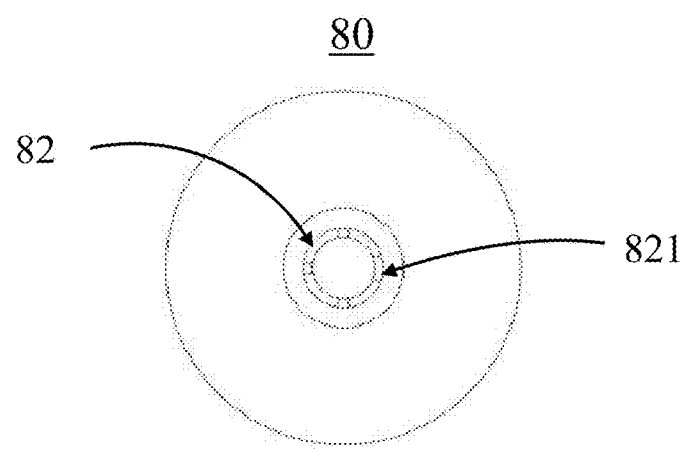
FIG. 25 is a top view of the separated base of the self-feeding watering device according to still another embodiment of the present invention.

Referring to FIG. 21, the structure of the long nozzle cover 30 is shown and is the same as that of the first embodiment. The top cover 31 is in a shape of a bottle cap with an opening upward. An inner wall of the top cover 31 has a second internal thread 312, which is configured to connect with an external water storage container (for example, a mineral water bottle) and to install a water storage bottle by rotation. A top end of the long mouth tube 32 protrudes from the bottom of the top cover 31. An inner bottom surface of the top cover 31 is also provided with a convex ring surrounding the long nozzle tube 32 for depositing sediment. An external thread 23 of the regulating component 20 is matched with the first internal thread 14 on the inner wall of the water storage unit 10*a*.

Preferably, a humidity sensor 70 is disposed adjacent to outer wall of the water storage unit 10*a*, and a wireless communication module is provided inside the humidity sensor 70. The humidity sensor 70 is used to detect water quantity and soil humidity in the water conduit 40*a*, and transmit monitoring results to a mobile terminal. The humidity sensor 70 is usefully disposed on the first flange 11. The humidity sensor 70 comprises a water quantity sensor 71 and at least one soil humidity sensor 72. The water quantity sensor 71 passes through the second through hole 111 and is disposed at the bottom of the water conduit 40*a*. The water quantity sensor 71 is used to detect the water level in the water conduit 40*a*. The soil humidity sensor 72 is disposed in the soil around the self-feeding watering device and is used for detecting humidity of the soil around the self-feeding watering device.

Further, the wireless communication module comprises a Bluetooth communication module, a WiFi communication module and a 3G/4G communication module. The mobile terminal has an App for the self-feeding watering device for receiving the monitoring results of the humidity sensor 70 through a wireless network.

Specifically, user can adjust the seepage speed of the self-feeding watering device according to the humidity value of the soil humidity sensor displayed on the mobile terminal, so as to achieve better automatic irrigation effect. When the water quantity sensor 71 detects water shortage in the water conduit 40*a*, it transmits relevant information to the mobile terminal, and the mobile terminal sends out a prompt tone to remind user to replenish water to the external water storage device.

Furthermore, the top cover 31 is engaged with a water storage bottle, or the top end of the long nozzle tube 32 is connected to the water storage tank through a hose. The top ends of the water storage bottle and the water storage tank are provided with a water filling port. The long nozzle tube 32 is provided with a water diversion string 60. One end of the water diversion string 60 is placed in the water storage bottle or the water storage tank, and the other end is placed at the bottom of the water storage unit 10*a*.

In particular, when the water storage unit 10*a* is inserted into the soil, the first flange 11 is preferably located on the soil surface, and the humidity sensor 70 is preferably prevented from being immersed in the soil due to a built-in battery of the humidity sensor 70. The soil humidity sensor 72 can be buried in the soil according to the demand.

In actual application, the convex ring of the top cover 31 extends into the water storage bottle, so that the impurities in the water storage bottle fall into gap between the top nozzle of the long nozzle tube 32 and the convex ring. The longer top nozzle of the long nozzle tube 32 can be conveniently connected with the hose between the water storage tank and the water storage tank.

Specifically, the water guide string 60 is configured to guide the water in the external water storage equipment into the water storage unit 10*a*, and the water in the water storage unit 10*a* flows into the water conduit 40*a* through the first through hole 12. Then, the water guide string 40*b* absorbs the water in the water conduit 40*a*, so that the air enters the water storage bottle from the long nozzle tube 32, and the air pressure in the water storage bottle increases, thereby making water flow out of the long nozzle tube 32. By turning the regulating component 20 for example in a clockwise direction, the bottom mouth of the long nozzle tube 32 is lower than the first through hole 12, so that the water level flowing out is higher than the bottom mouth of the long nozzle tube 32, and the air cannot enter the long nozzle tube 32 and the water storage bottle. As a result, the water in the water storage bottle cannot flow out. By turning the regulating component 20 for example in a counter clockwise direction, the bottom mouth of the long nozzle tube 32 is higher than the first through hole 12, the outflow water from the tube 32 is absorbed by the water guide string 40*b*, the water level in the water storage unit 10*a* drops, and the air enters the water storage bottle through the long nozzle tube 32, so that the water in the water storage bottle flows out into the water storage unit 10*a*.

Furthermore, the bottom end of the water conduit 40*a* is provided with a branch outlet extending outward. When not in use, the branch outlet is blocked by a rubber plug. In another alternative embodiment, the bottom end of the water conduit 40*a* has a bent port which is connected to another separated second water conduit or the second water storage unit 10*a* through a hose. The bottom of the second water storage unit 10*a* is provided with an inlet, a side wall of the second water storage unit 10*a* is provided with a water guide through hole. The water guide string 40*b* is penetrated through the water guide through hole. The other components are the same as these embodiments mentioned above and will not be described in detail.

Referring to FIG. 22, FIG. 23, FIG. 24 and FIG. 25, in accordance with still another embodiment of the present invention, a self-feeding watering device 200 is shown. The self-feeding watering device 200 is substantially similar to the device 100 described above, except that the self-feeding watering device 200 further comprises a base 80. The base 80 is a conical platform and is an integrated base 80 or a separated base 80. The integrated base 80 is integrally formed as a whole together with the water storage unit, and the water storage unit is arranged in the top center of the conical platform. A top surface of the base 80 in a separation type is provided with a conical groove 81. The top of the conical groove 81 extends upward with a hollow cylindrical side wall 82, and the cylindrical side wall 82 is provided with a plurality of grooves 821. Position and width of the grooves 821 correspond to those of the wing plates of the water storage unit and the water guide tube respectively.

Preferably, for a relatively small flowerpot, the water storage unit with the base 80 can be placed adjacent to the flowerpot, and the automatic watering and irrigation of the soil can be realized by embedding the water guide string and the soil moisture sensor into the soil.

Specifically, a diameter of the base 80 is larger than that of the first flange on the water storage unit, and the base 80 in a integration type is fixedly connected with the water storage unit and integrally formed as a whole with the unit, so that the self-feeding watering device 200 can be stably placed on the desktop or the ground.

Specifically, the conical groove 81 in the center of the top surface of the separated base 80 has the same shape as the cone at the bottom of the water storage unit, and an inner diameter of the hollow cylindrical side wall 82 is consistent with an outer diameter of the water storage unit. The groove 821 is correspondingly arranged at a position corresponding to the wing plates of the water storage unit and the water guide pipe. Accordingly, the water storage unit can be inserted into the separated base 80.

Figure 26:
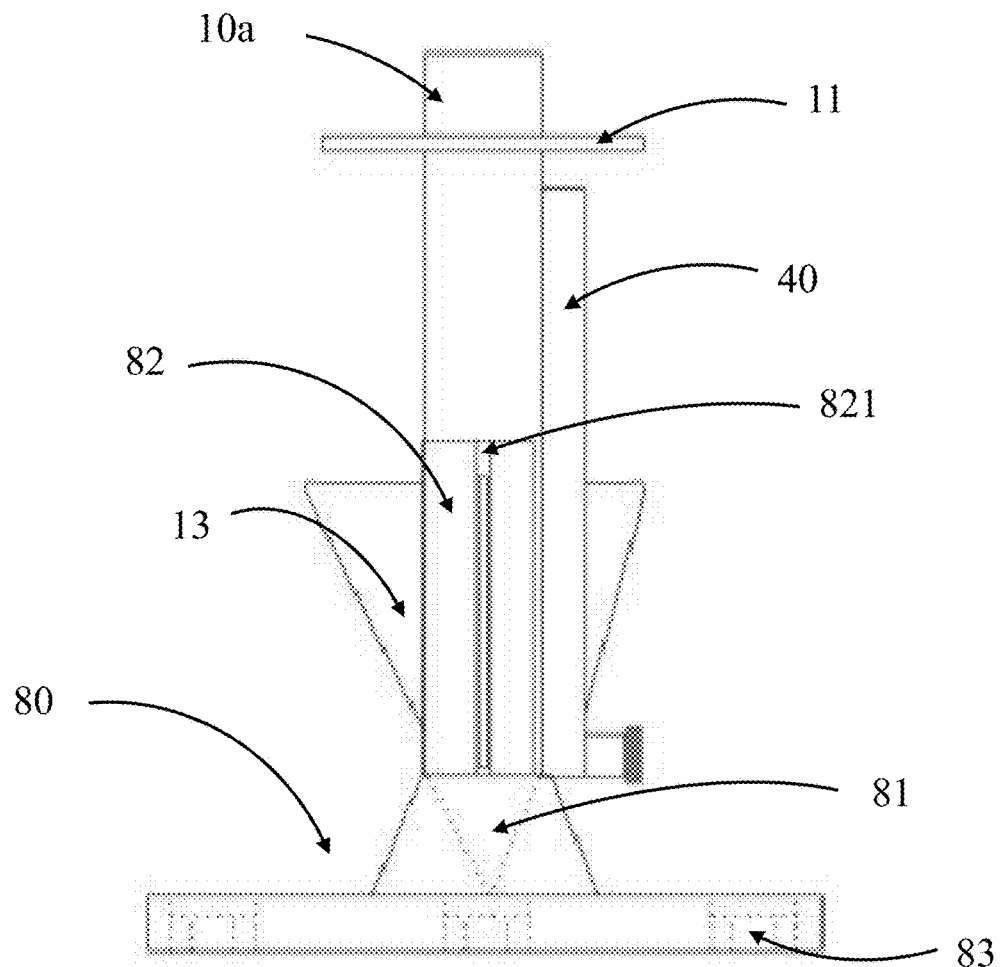
FIG. 26 is a schematic view of a water storage unit with a base fixed by bolts of a self-feeding watering device according to yet another embodiment of the present invention.
Figure 27:
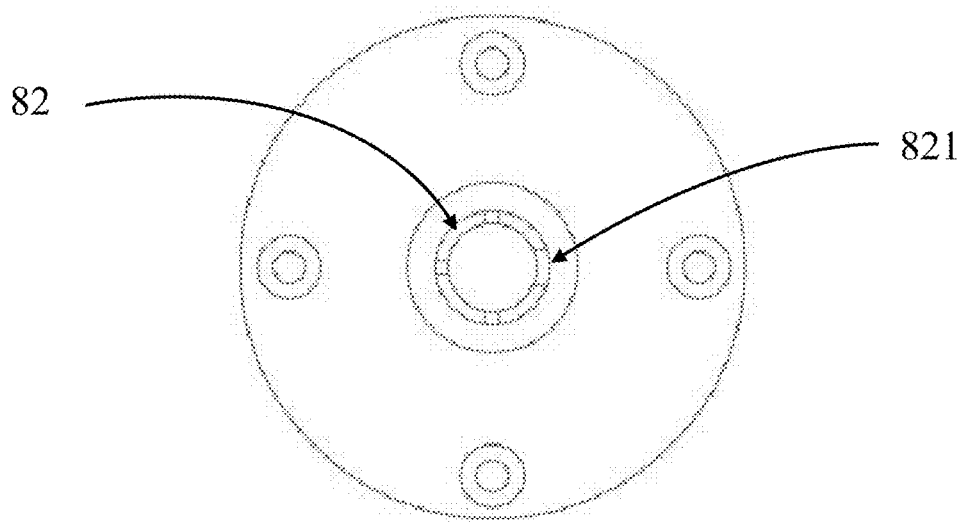
FIG. 27 is a schematic top view of the fixing base of the self-feeding watering device according to yet another embodiment of the present invention.

Refer to FIG. 26 and FIG. 27, illustrating yet another embodiment of the present invention. The base 80 is fixed on a board by bolts 83 to make installation of the self-feeding watering device 200 more firm. The other components are the same as the embodiments mentioned above and will not be described in detail.

In the self-feeding watering devices 100 and 200, in operation, the water in the water storage bottle or the water storage tank flows into the bottom of the water storage unit 10a through the long nozzle tube 32, and the water in the water storage unit 10a flows into the water conduit 40a. Then, the water guide string 40b in the water conduit 40a absorbs water. When there is no water conduit, the water guide string 40 (as described in the first embodiment) directly absorbs water. The water is diffused into the soil at the other end of the water guiding rope 40b to make the soil infiltrate, so as to achieve the purpose of irrigating the soil. The humidity sensor 70 is used to detect whether there is water in the water conduit 40a and the humidity value of the soil around the self-feeding watering device, and send the detected value to the mobile terminal through the wireless communication module. As such, user can intuitively read the water quantity in the self-feeding watering device and the humidity value of the soil through the mobile terminal. Accordingly, user can adjust the water flow speed of the self-feeding watering device in time, and add the water in time when there is no water in the water conduit 40a. This will better protect the planted plants. the present invention has stable installation structure, easy production, low cost and easy popularization.

The above are described as embodiments of the present invention, however, it is no way intended to limit the present invention to these embodiments. Any changes, equivalences and modifications within the spirit and scope of the present invention should be encompassed within the scope appended claims.

What is claimed is:

1. A self-feeding watering device for water self-feeding, comprising:
a water storage unit,
a regulating component and a long nozzle cover which are sheathed at an opening of the water storage unit, and
a water guide string extending from a side wall of the water storage unit,
wherein the regulating component is in threaded connection to the water storage unit, the long nozzle cover comprises a top cover having an opening upward for connecting with an external water storage container and a long nozzle tube which penetrates through the top cover and communicates with the top cover, the long nozzle tube further penetrating through the regulating component and extending towards a bottom of the water storage unit, a first part of the water guide string being placed at the bottom of the water storage unit and a second part of the water guide string extending out of the side wall of the water storage unit, the water guide string being configured for allowing water at the bottom of the water storage unit to penetrate into outside of the water storage unit, and further guiding the water into the soil along the water guide string for automatic irrigation.

2. The self-feeding watering device of claim 1, wherein the water storage unit is mainly a hollow cylinder, the bottom of the water storage unit is in a shape of a cone, a top of the water storage unit is provided with a first flange extending outward, a center of the first flange is provided with a threaded through hole, and an outside of the first flange is provided with at least one first groove which is configured for disposing the water level gauge.

3. The self-feeding watering device of claim 2, wherein the regulating component is a hollow stud, and a top of the regulating component is provided with a second flange extending outward, a stud body of the regulating component having an external thread, the regulating component being in threaded connection to the threaded through hole of the water storage unit, the regulating component being capable of being lifted and lowered by rotation to adjust water surface level in the water storage unit, and controlling penetration speed of water.

4. The self-feeding watering device of claim 3, wherein the top cover and the long nozzle tube of the long nozzle cover are integrated as a whole and the top cover is in a shape of a bottle cap with an opening upward, a bottom of the top cover being provided with a protrusion bar protruding downward and an inner wall of the top cover being provided with an internal thread for threaded connection with an external water storage container, the top end of the long nozzle tube protruding from the bottom of the top cover.

5. The self-feeding watering device of claim 4, wherein a top face of the second flange of the regulating component is provided with at least one second groove, and the protrusion bar at the bottom of the top cover is inserted in the second groove, the top face of the second flange being provided with an indication mark for indicating rotation direction and a direction mark for indicating the rotation angle.

6. The self-feeding watering device of claim 2, wherein a plurality of wing plates are interposed between a bottom surface of the first flange and a side wall of the water storage unit, the wing plates are in one shape of right triangle and arc, when each of the wing plates is a right triangle plate with two right angle edges respectively adjacent to the bottom surface of the first flange and the side wall of the water storage unit, the hypotenuse of each right triangle plate extends to an outer edge of the first flange and the side wall of the water storage unit at two ends, and the top surface of the first flange is provided with ten equal scales for indicating the water level height.

7. The self-feeding watering device of claim 1, wherein the side wall of the water storage unit is provided with at least one through hole, the water guide string is penetrated outward from the through hole, one end of the water guide string is placed in the water storage unit, the other end of the water guide string extends out of the water storage unit, and position of the through hole of the water storage unit is lower than a bottom end of the regulating component.

8. The self-feeding watering device of claim 7, wherein a water outlet is defined at a bottom end of the water storage unit, a second water storage unit is connected to the water storage unit through a hose, a bottom of the second water storage unit is provided with another water inlet, and a side wall of the second water storage unit is provided with the through holes, each of the through holes being penetrated with the water guide string.

9. The self-feeding watering device of claim 7, wherein the top cover is engaged with a water storage bottle or the top end of the long nozzle tube is connected to the water storage tank through a hose, and the top ends of the water storage bottle and the water storage tank are provided with a water filling port.

10. A self-feeding watering device for water self-feeding, comprising:
a water storage unit,
a regulating component and a long nozzle cover which are sheathed at an opening of the water storage unit, and a water conduit disposed on an outer wall of the water storage unit and communicating with the water storage unit, wherein the regulating component is in threaded connection to the water storage unit, the long nozzle cover comprises a top cover which has an opening upward to connect with an external water storage container and a long nozzle tube which penetrates through the top cover and communicates with the top cover, the long nozzle tube further penetrates through the regulating component and extends towards a bottom of the water storage unit, a water guide string is provided in the water conduit, one end of the water guide string is placed at a bottom of the water conduit, the other end of the water guide string extends out of the water conduit, the water storage unit allows water to flow into the water conduit, and the water guide string further guide the water into the soil for automatic irrigation.

11. The self-feeding watering device of claim 10, wherein a first flange extending outward is disposed adjacent to a top of the water storage unit, the water conduit and the water storage unit are integrally formed as a whole, the water conduit is arranged on the outer wall of the water storage unit, the water storage unit and the water conduit use a common side wall, a bottom end of the water conduit is arranged at an approximate bottom end of the water storage unit, the common side wall is provided with a first through hole which is arranged at the bottom end of the water conduit and communicates the water conduit and the water storage unit, a top opening of the water conduit is positioned below the first flange, and a second through hole is provided at a position of the first flange corresponding to the top opening of the water conduit.

12. The self-feeding watering device of claim 11, wherein a humidity sensor is disposed adjacent to an outer wall of the water storage unit, and a wireless communication module is provided inside the humidity sensor, wherein the humidity sensor is configured to detect water quantity and soil humidity in the water conduit, and transmit monitoring results to a mobile terminal, the humidity sensor is disposed on the first flange, the humidity sensor comprises a water quantity sensor and at least one soil humidity sensor, the water quantity sensor passes through the second through hole and is disposed at the bottom of the water conduit, the water quantity sensor is configured to detect the water level in the water conduit, the soil humidity sensor is disposed in the soil around the self-feeding watering device and is configured for detecting humidity of the soil around the self-feeding watering device.

13. The self-feeding watering device of claim 12, wherein the wireless communication module comprises a Bluetooth communication module, a WiFi communication module and a 3G/4G communication module, the mobile terminal has a self-feeding watering device App for receiving the monitoring results of the humidity sensor through a wireless network.

14. The self-feeding watering device of claim 11, wherein the water storage unit is mainly a hollow cylinder, an inner wall of the water storage unit has a first internal thread, a bottom of the water storage unit is approximately in a shape of a cone, an outer wall of the water storage unit has a plurality of wing plates, the wing plates are in one shape of a right triangle and an arc, the wing plates are configured to prevent the water storage unit from rotating in the soil, a top surface of the first flange is provided with ten equal scales for indicating the rotation angle of the regulating component, the regulating component is a hollow stud, a top of the regulating component is provided with a second flange extending outward, a stud body of the regulating component has an external thread, the regulating component is in threaded connection to the threaded through hole of the water storage unit, the regulating component is be capable of being lifted and lowered by rotation to adjust water surface level in the water storage unit, thereby controlling penetration speed of water, the top cover and the long nozzle tube of the long nozzle cover are integrated as a whole and the top cover is in a shape of a bottle cap with an opening upward, a bottom of the top cover is provided with a protrusion bar protruding downward and an inner wall of the top cover is provided with a second internal thread for threaded connection with an external water storage container, the top end of the long nozzle tube protruding from the bottom of the top cover.

15. The self-feeding watering device of claim 14, wherein the self-feeding watering device further comprises a base, the base is a conical platform and is an integrated base or a separated base, wherein the integrated base is integrally formed as a whole together with the water storage unit, and the water storage unit is disposed in a top center of the conical platform, a top surface of the base in a separation type is provided with a conical groove, the top of the conical groove extends upward with a hollow cylindrical side wall, and the cylindrical side wall is provided with a plurality of grooves, position and width of the grooves corresponding to those of the wing plates of the water storage unit and the water guide tube respectively.

16. The self-feeding watering device of claim 10, wherein the bottom end of the water conduit is provided with a branch outlet extending outward, the water conduit is connected to one of a separated second water guide tube and a second water storage unit through a hose, the bottom of the second water storage unit is provided with an inlet, a side wall of the second water storage unit is provided with a water guide through hole, and the water guide string is penetrated through the water guide through hole.

17. The self-feeding watering device of claim 10, wherein a third through hole is defined on a side wall of the water conduit, one end of the water guide string is placed at the bottom of the water conduit, and the other end of the water guide string extends outward from one of a top opening of the water conduit and the third through hole, when the water guide string extends outward from the third through hole, water diversion speed of the water guide string is accelerated.

18. The self-feeding watering device of claim 10, wherein one of a water storage bottle and a water storage tank is provide for water source, wherein the top cover is engaged with the water storage bottle, the top end of the long nozzle tube is connected to the water storage tank through a hose, and the top ends of the water storage bottle and the water storage tank are respectively provided with a water filling port, wherein the long nozzle tube is provided with a water diversion string, one end of the water diversion string is placed in one of the water storage bottle and the water storage tank, and the other end is placed at a bottom of the water storage unit.

* * * * *